United States Patent [19]

Cancro et al.

[11] Patent Number: 5,332,124

[45] Date of Patent: Jul. 26, 1994

[54] MULTI-CAVITY DISPENSING REFILL CARTRIDGE

[75] Inventors: Lewis P. Cancro, Trumbull; David R. Williams, Monroe, both of Conn.

[73] Assignee: Chesebrough-Pond's, USA Co., A Division of Conopco, Inc., Greenwich, Conn.

[21] Appl. No.: 62,993

[22] Filed: May 17, 1993

[51] Int. Cl.⁵ .............................................. B67D 5/52
[52] U.S. Cl. ..................................... 222/137; 222/327
[58] Field of Search ............... 222/137, 327, 135, 145, 222/326, 541

[56] References Cited

U.S. PATENT DOCUMENTS

| | | |
|---|---|---|
| 825,680 | 7/1906 | Raymond . |
| 1,363,064 | 12/1920 | Stegath . |
| 1,698,404 | 1/1929 | Hopkins . |
| 1,699,532 | 1/1929 | Hopkins . |
| 1,736,264 | 11/1929 | Johnson .................................. 215/6 |
| 2,058,251 | 10/1936 | Nitardy et al. . |
| 2,166,307 | 7/1939 | Libby . |
| 2,376,944 | 5/1945 | Songer ................................... 222/390 |
| 2,661,871 | 12/1953 | Huenergardt ......................... 222/129 |
| 2,752,920 | 7/1956 | Kurkjian ............................... 128/261 |
| 2,789,731 | 4/1957 | Marraffino ............................ 222/129 |
| 2,819,723 | 1/1958 | Meyer et al. ......................... 132/116 |
| 2,918,199 | 12/1959 | Marraffino ................................ 222/1 |
| 2,925,938 | 2/1960 | Parsons .................................... 222/94 |
| 2,944,704 | 7/1960 | Taylor ...................................... 222/94 |
| 2,944,705 | 7/1960 | Strumor ................................... 222/94 |
| 2,954,144 | 9/1960 | Elam et al. .............................. 222/82 |
| 2,959,327 | 11/1960 | Bloom ...................................... 222/94 |
| 2,973,883 | 3/1961 | Modderno .............................. 222/94 |
| 3,105,615 | 10/1963 | Koga ........................................ 222/94 |
| 3,166,221 | 1/1965 | Nielsen .................................. 222/137 |
| 3,179,290 | 4/1965 | Whitney ..................................... 222/1 |
| 3,188,056 | 6/1965 | Trumbull et al. ...................... 259/37 |
| 3,197,071 | 7/1965 | Kuster ...................................... 222/94 |
| 3,200,995 | 8/1965 | Gangwisch ............................. 222/94 |
| 3,217,931 | 11/1965 | Farrar et al. ........................... 222/94 |
| 3,231,147 | 1/1966 | Leahy ................................. 222/326 X |
| 3,266,671 | 8/1966 | Gelpey ..................................... 22/94 |
| 3,310,201 | 3/1967 | Guarr et al. .......................... 221/197 |
| 3,326,416 | 6/1967 | Hayes ......................................... 222/4 |
| 3,335,912 | 8/1967 | Reeves, Jr. ............................. 222/94 |
| 3,442,424 | 5/1969 | Prussin et al. ......................... 222/81 |
| 3,455,489 | 7/1969 | Meshberg ............................... 222/94 |
| 3,458,076 | 7/1969 | Babcock ................................. 215/16 |
| 3,472,433 | 10/1969 | Thomas ............................. 222/326 X |
| 3,486,661 | 12/1969 | Friedrich et al. ...................... 222/95 |
| 3,490,651 | 1/1970 | Abplanalp .............................. 222/94 |
| 3,499,387 | 3/1970 | Zippel .................................... 103/38 |
| 3,503,539 | 3/1970 | O'Donnell ............................. 222/95 |
| 3,506,157 | 4/1970 | Dukess ................................... 222/94 |
| 3,508,682 | 4/1970 | Hollis et al. ........................... 222/48 |
| 3,525,997 | 8/1970 | O'Donnell ............................. 222/95 |
| 3,532,254 | 10/1970 | Burke ..................................... 222/94 |
| 3,540,623 | 11/1970 | Wittke et al. ......................... 222/94 |
| 3,543,966 | 12/1970 | Ryan et al. ............................ 222/94 |

(List continued on next page.)

FOREIGN PATENT DOCUMENTS 294672 12/1988 European Pat. Off. .
2095844 11/1972 France .

*Primary Examiner*—Kevin P. Shaver
*Attorney, Agent, or Firm*—Brumbaugh, Graves, Donohue & Raymond

[57] ABSTRACT

A disposable refill cartridge, for use with a reusable base and a reusable dispensing head for the simultaneous coextension of at least two flowable materials. The disposable refill cartridge has a hollow inner cylinder for containing a flowable material. The inner cylinder has a first generally open top end which can be temporarily sealed until the refill cartridge is combined with a reusable dispensing head. The second or bottom end of the refill cylinder telescopically and slidingly accommodates a piston head which is compressibly engagable with a piston rod of the reusable base. The piston head rides sealingly along the interior walls of the inner refill cylinder when compressed by the piston rod forces the flowable material to flow out of the refill cylinder and through outlet means of the dispensing head. Once the flowable material has been expended, the refill cartridge can be discarded and a new one can be used in conjunction with the reusable base and dispensing head.

3 Claims, 2 Drawing Sheets

U.S. PATENT DOCUMENTS

| | | | |
|---|---|---|---|
| 3,570,719 | 3/1971 | Schiff | 222/137 |
| 3,591,054 | 7/1971 | Miles | 222/135 |
| 3,599,838 | 8/1971 | LaVange | 222/129 |
| 3,603,485 | 9/1971 | Vivier | 222/129 |
| 3,608,782 | 9/1971 | Sathicq | 222/94 |
| 3,613,956 | 10/1971 | McCulloch | 222/136 |
| 3,630,415 | 12/1971 | Morane et al. | 222/129 |
| 3,651,931 | 3/1972 | Hsiung | 206/47 A |
| 3,672,544 | 6/1972 | Marand | 222/94 |
| 3,710,984 | 1/1973 | Webster | 222/145 |
| 3,731,848 | 5/1973 | Nakanishi | 222/129 |
| 3,735,900 | 5/1973 | Gores | 222/145 |
| 3,747,804 | 7/1973 | Raaf et al. | 222/1 |
| 3,767,078 | 10/1973 | Gortz et al. | 220/63 R |
| 3,767,085 | 10/1973 | Cannon et al. | 222/137 X |
| 3,788,520 | 1/1974 | Dukess | 222/94 |
| 3,799,398 | 3/1974 | Morane et al. | 222/39 |
| 3,814,287 | 6/1974 | Darbon et al. | 222/94 |
| 3,814,298 | 6/1974 | Hansen | 222/153 |
| 3,850,346 | 11/1974 | Richardson et al. | 222/145 |
| 3,870,147 | 3/1975 | Orth | 206/222 |
| 3,876,111 | 4/1975 | Swain | 222/94 |
| 3,885,710 | 5/1975 | Cohen | 222/145 |
| 3,918,612 | 11/1975 | Voulgaris | 222/144 |
| 3,931,912 | 1/1976 | Hsung | 222/94 |
| 3,952,920 | 4/1976 | Bergman | 222/137 |
| 3,964,643 | 6/1976 | Morane et al. | 222/145 |
| 3,966,090 | 6/1976 | Prussin et al. | 222/94 |
| 3,980,222 | 9/1976 | Hood | |
| 4,010,872 | 3/1977 | Lozano et al. | 222/94 |
| 4,014,463 | 3/1977 | Hermann | 222/145 |
| 4,040,420 | 8/1977 | Speer | 128/218 M |
| 4,046,288 | 9/1977 | Bergman | 222/135 |
| 4,062,475 | 12/1977 | Harris et al. | 222/95 |
| 4,062,477 | 12/1977 | Morane | 222/145 |
| 4,067,479 | 1/1978 | Moline | 222/137 X |
| 4,073,406 | 2/1978 | Goncalves | 222/94 |
| 4,089,437 | 5/1978 | Chutter et al. | 222/94 |
| 4,098,435 | 7/1978 | Weyn | 222/94 |
| 4,121,739 | 10/1978 | Devaney et al. | 222/137 |
| 4,159,066 | 6/1979 | Silver | 222/129 |
| 4,240,566 | 12/1980 | Bergman | 222/135 |
| 4,261,481 | 4/1981 | Speer | 222/135 |
| 4,271,984 | 6/1981 | Ducros et al. | 222/94 |
| 4,344,919 | 8/1982 | Kelterbaum | 422/133 |
| 4,356,935 | 11/1982 | Kamin | 222/327 X |
| 4,360,130 | 11/1982 | Nishimura et al. | 222/153 |
| 4,437,589 | 3/1984 | Potter | 222/327 |
| 4,457,454 | 7/1984 | Meshberg | 222/95 |
| 4,460,109 | 7/1984 | Ducros et al. | 222/94 |
| 4,461,403 | 7/1984 | Prahs | 222/129 |
| 4,463,875 | 8/1984 | Tepic | 222/82 |
| 4,471,888 | 9/1984 | Herb et al. | 222/137 |
| 4,487,757 | 12/1984 | Kiozpeoplou | 424/7.1 |
| 4,509,641 | 4/1985 | Scieri et al. | 206/219 |
| 4,528,180 | 7/1985 | Schaeffer | 424/52 |
| 4,566,610 | 1/1986 | Herb | 222/137 |
| 4,582,224 | 4/1986 | Proksa et al. | 222/135 |
| 4,585,149 | 4/1986 | Zulauf | 222/94 |
| 4,687,663 | 8/1987 | Schaeffer | 424/52 |
| 4,690,306 | 9/1987 | Staheli | 222/327 X |
| 4,742,940 | 5/1988 | Wilkinson | 222/162 |
| 4,744,494 | 5/1988 | Seager et al. | 222/391 |
| 4,747,517 | 5/1988 | Hart | 222/137 |
| 4,767,026 | 8/1988 | Keller et al. | 222/137 |
| 4,771,919 | 9/1988 | Ernst | 222/145 X |
| 4,813,871 | 3/1989 | Friedman | 433/90 |
| 4,869,394 | 9/1989 | Hurst | 222/197 |
| 4,964,539 | 10/1990 | Mueller | 222/94 |
| 4,974,756 | 12/1990 | Pearson et al. | 222/145 |
| 4,981,241 | 1/1991 | Keller | 222/137 |
| 5,020,694 | 6/1991 | Pettengill | 222/137 |
| 5,038,963 | 8/1991 | Pettengill et al. | 222/137 X |

MULTI-CAVITY DISPENSING REFILL CARTRIDGE

BACKGROUND OF THE INVENTION

The present invention relates to rigid telescopically arranged multi-cavity dispensing containers for flowable material, such as tooth paste and the like, from which it is desired to dispense simultaneously two or more reactive substances which require separate storage until time of use. More particularly it relates to a disposable refill cartridge, for use in a dispensing container of the above type, which can be used in conjunction with a reusable dispensing head and a reusable base.

There exists a desire to provide sodium bicarbonate and peroxide gel as components of toothpaste. Sodium bicarbonate is a well known and commonly used abrasive and cleaner. Peroxide gel is regarded as a beneficial ingredient to help promote healthy gums. These components are reactive when mixed, and therefore must be maintained separately until time of use.

U.S. Pat. Nos. 5,020,694 to Pettengill and U.S. Pat. No. 5,038,963, to Pettengill and Gentile, which are hereby incorporated by reference, disclose rigid piston type multi-cavity dispensing containers for the simultaneous coextrusion in predetermined proportions of two or more materials which may have different rheologies. The lower body member of the containers has a base and two or more piston rods with pistons attached thereto. The upper body member has parallel cylinders for containing the flowable materials and outlet means for dispensing the materials. The lower end of the cylinders receive the pistons whereby the relative compression of upper and lower body members forces the flowable materials out through the outlet means. This produces a single, banded unmixed stream of material that can be neatly and easily applied onto the narrow width of a toothbrush. If, after all of the flowable materials are expended, the upper and lower members are pulled apart, the piston heads remain attached to the piston rods of the lower member. Thus any upper body refill unit would not come equipped with pistons to seal the flowable materials within the upper body parallel cylinders. Such a refill unit would be messy and impractical. Accordingly, both upper and lower body members of these designs are discarded after the contents of dispenser are used up. This produces unnecessary waste and is not the most economical of arrangements.

Thus it is an object of this invention, for ecological and economical reasons, to provide a multi-cavity dispensing refill cartridge which can be used in conjunction with a reusable base and a reusable dispensing head, for the simultaneous coextrusion, in predetermined portions, of two or more flowable materials, which may have different rheologies, upon the relative compression of the reusable dispensing head and the reusable base, to produce a single, banded unmixed stream of material that can neatly and easily be applied onto the narrow width of a toothbrush- It is a further object to provide such a refill cartridge which, in conjunction with the reusable base and reusable dispensing head, dispenses a single stream of unmixed material and which provides segregation of the component materials within the dispenser both prior to and after dispensing.

SUMMARY OF THE INVENTION

In accordance with the present invention there is provided a disposable refill cartridge, for use with a reusable base and a reusable dispensing head for the simultaneous coextrusion of at least two flowable materials.

The reusable dispensing head has at least two hollow and separate parallel outer cylinders having a first generally closed end and outlet channels at the closed end. The disposable refill cartridge comprises a hollow inner refill cylinder which is telescopically accommodated within one of the outer cylinders of the dispensing head. Two inner refill cylinder are used, each containing one of the flowable materials. The inner refill cylinder has a first generally open top end which can be temporarily sealed until the refill cartridge is combined with the reusable dispensing head. Once loaded in the reusable dispensing head, the open end of each inner refill cylinder is in fluid communication with the outlet channels of the dispensing head. The second or bottom end of the inner refill cylinder, telescopically and slidingly accommodates a piston head which is compressably engagable with one of a pair of piston rods provided on the reusable base. The piston head conforms to ride sealingly along the interior wall of the inner refill cylinder so as to force the flowable material to flow toward the open top end upon relative compression of the inner refill cylinder and piston head. The flowable material flows out of each inner cylinder and through the outlet means of the dispensing head.

Once the disposable refill cartridge has been emptied, it can be discarded, and the dispensing head and reusable base, which comprise the bulk of the material of the entire unit, can be reused in conjunction with new refill cartridges.

For a better understanding of the present invention together with other and further objects, reference is made to the following description, taken in conjunction with the accompanying drawings, and its scope will be pointed out in the appended claims.

DETAILED DESCRIPTION

Figure 1:
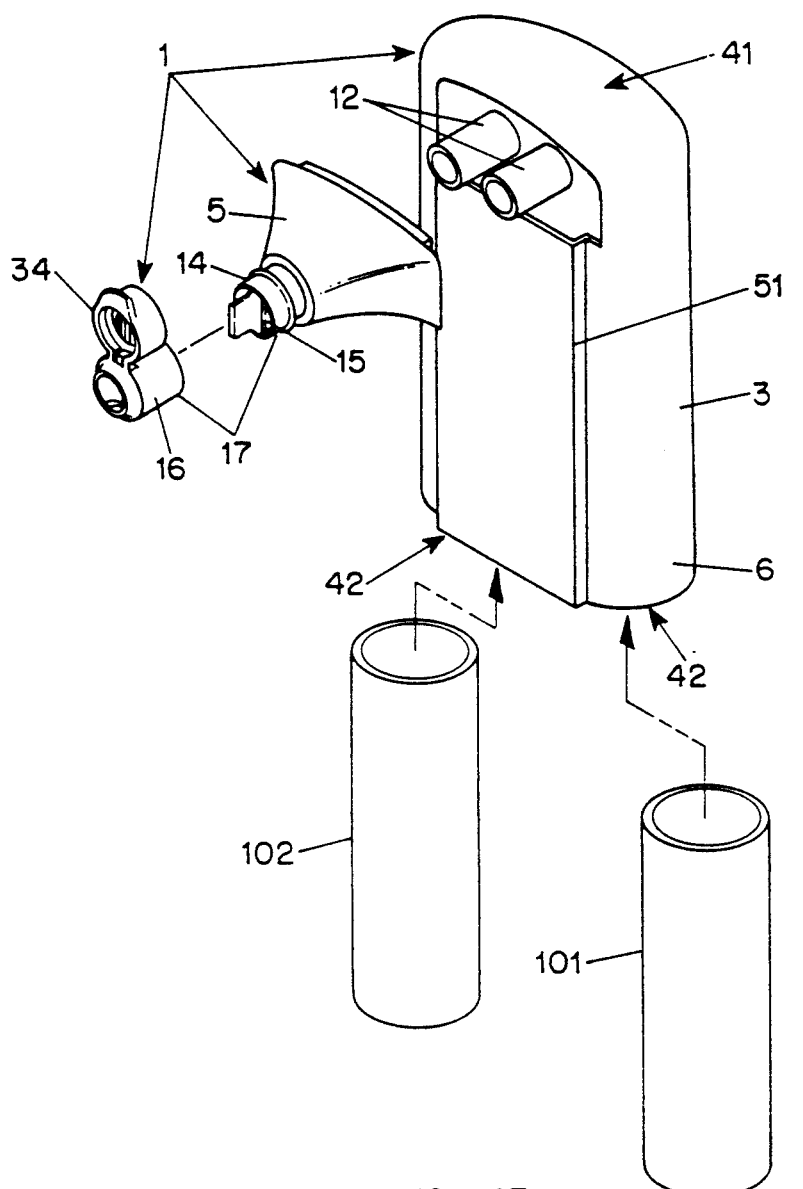
FIG. 1 is an exploded view of a refillable multi-cavity dispenser composed of a reusable dispensing head a pair of refill cartridges and a reusable base.
Figure 1:
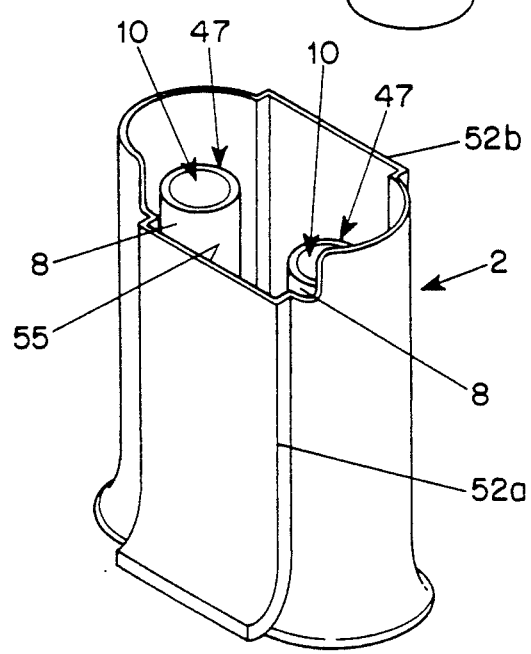

An exploded view of a refillable multi-cavity dispenser composed of a reusable dispensing head 1, a reusable base 2, and two refill cartridges 101, 102, is shown in FIG. 1. Each refill cartridge cylinders 101, 102 contain one of two flowable materials. In use, the refill cartridges 101, 102 are loaded within the dispensing head 1 and together they are mounted on reusable base 2. The relative compression of the dispensing head 1 and the base 2 causes flowable material to be forced out of the refill cartridges to the outlet channels 12 and through outlet means 17. Each flowable material follows a separate path and is maintained segregated from the other until it is finally dispensed by nozzle 16. Once the flowable materials in the refill cartridges have been used up, the dispensing head and base can be pulled apart. The refill cartridges can then be removed from the dispensing head and replaced with fresh cartridges.

The dispensing head 1 has a upper shroud 3 which incorporates two hollow, separate, and parallel outer cylinders 6. The top end 41 of each outer dispensing cylinder is generally closed except for the outlet channels 12 while the bottom end 42 of each outer dispensing cylinder slidingly and telescopically receives one of the refill cartridges 101, 102.

Figure 2:
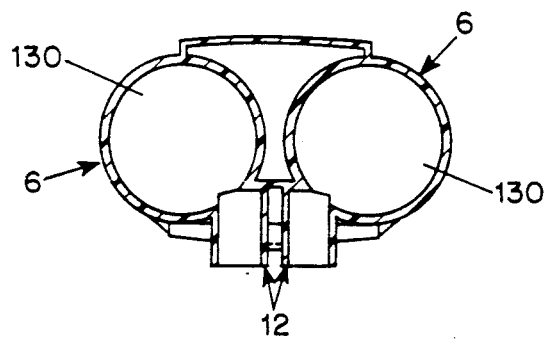
FIG. 2 is a sectional view of the FIG. 1 dispensing head taken through the outlet channels.

Each refill cartridge comprises a cylinder containing one of two reactive flowable materials. When the refill cartridges 101, 102 are loaded in the dispensing head 1, the top ends 152 of the inner refill cylinders are open providing fluid communication between the flowable material contained therein, the upper portions 130 of the outer cylinders and the outlet channels 12. As shown in FIG. 2, a sectional view taken through the center of the outlet channels 12, outlet channels 12 provide fluid communication between the outer cylinder upper portions 130 and outlet means 17. Outlet means 17 comprises outlet assembly 5 and nozzle 16. Nozzle 16 is sealed by hinged cap 34.

Figure 4:
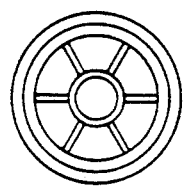
FIG. 4 is the FIG. 3 refill cartridge as viewed from below.
Figure 3:
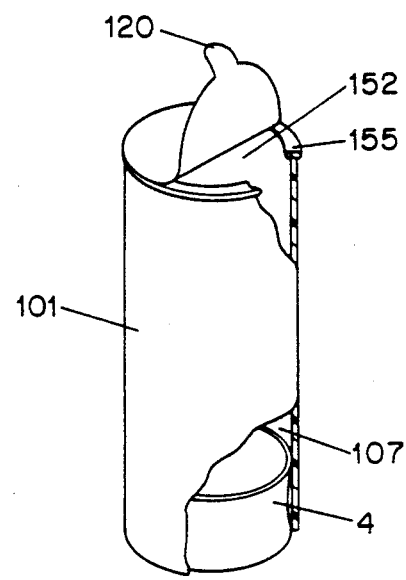
FIG. 3 shows a perspective view of a refill cartridge.

Referring to FIGS. 3 and 4, which are a frontal cutaway view and bottom view of either refill cartridge 101 or 102 it can be seen that the bottom end of each inner refill cylinder telescopically and slidingly accommodates a piston head 4 which conforms to ride sealingly within the inner walls 107. The top end 152 of the refill cartridges 101 and 102 can be temporarily sealed by removable peel off seal 120. Thus the flowable materials can be completely sealed within the refill cartridges 101 and 102 allowing them to be handled and sold together as a unit separate and independent from the dispensing head 1 and reusable base 2.

A flange 155 extends around the top edge of the inner cylinders. Flange 155 provides a surface to which peel off seals 120 can adhere. Furthermore, flange 155 provides a seal between the inner and outer cylinders. This seal prevents flowable material from flowing into the area between the outer wall of the inner cylinder and the inner wall of outer cylinder. The flowable material is therefore constrained in such a way that it must flow out of the first end of the inner cylinder and into the upper portion 130 of the outer cylinders. From there the flowable materials each flow along their separate segregated paths through the outlet channels 12 and the outlet means 17. The flange 155 also provides for a friction fit which keeps the inner cylinders from falling out of the outer cylinders.

Figure 5:
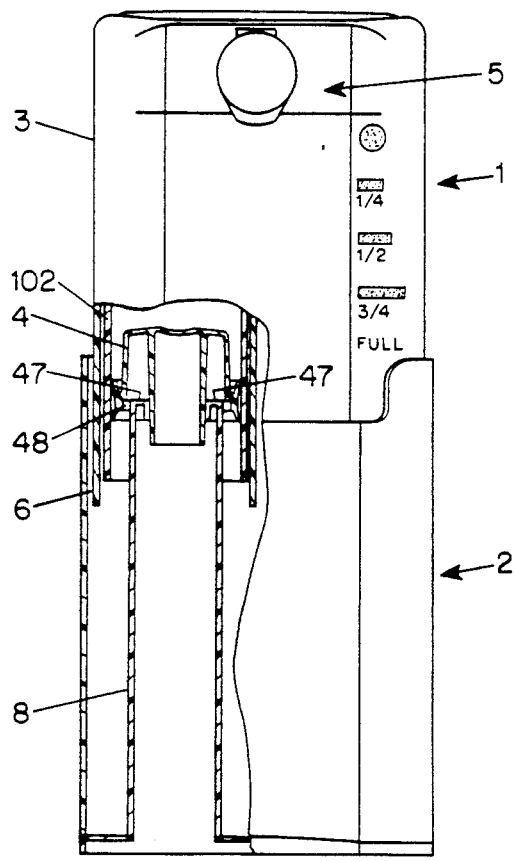
FIG. 5 is a frontal cutaway view of a refill cartridge loaded in a dispensing head which in turn is mounted on a reusable base.
Figure 6A:
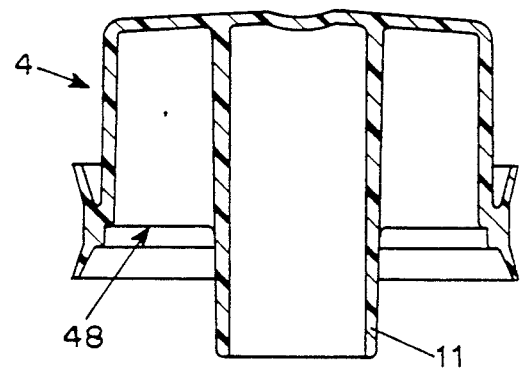
FIGS. 6a and 6b are respectively a sectional side view and a bottom view of a piston head.
Figure 6B:
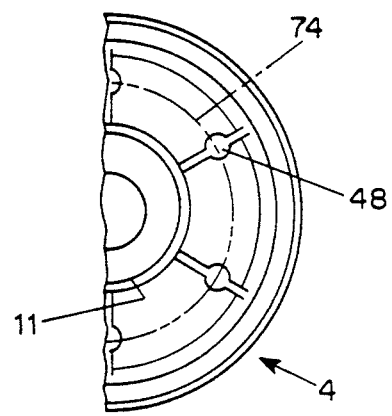

Referring back to FIG. 1 it can be seen that the reusable base 2 has a pair of parallel piston rods 8, with openings 10. Openings 10 are designed to surround the central portion 11, shown in FIGS. 6a and 6b, of the piston heads 4. The openings 10 are dimensioned such that central portion 11 can easily slide into and out of them. This makes the piston heads 4 compressibly engagable with piston rods 8. In other words, when the dispensing head 1, with the refill cartridges 101 and 102 loaded therein, and the reusable base 2 are compressed together, edge 47 of the piston rods 8 abuts and presses upon the bottom portion 48 of piston heads 4, as shown in FIG. 5. Referring to FIGS. 6a and 6b, which are respectively a sectional view from the side and bottom view of a piston head 4, it can be seen that bottom portion 48 of the piston head 4 is the bottom edges of ribs 74 which extend between the cap portion 76 of piston head 4 and central portion 11. In addition to providing a surface for edges 47 of the piston rods 8 to press against, ribs 74 also contribute to the structural stiffness of the piston heads 4.

When the dispensing head 1 and refill cartridges 101 and 102 are pulled apart from the reusable base 2, central portions 11 of the piston heads 4 slide easily out of openings 10. Thus the piston heads 4 only engage the piston rods 8 when refill cartridge 1 and reusable base 2 are compressed. Other compressibly engagable arrangements are also possible. For example, the piston heads 4 could be provided with a flat bottom which could engage a flat top of the piston rods 8. The provision of lower portions 11 and openings 10, however, help to keep the piston heads properly oriented within cylinders 101 and 102.

As shown in FIG. 1, reusable base 2 is dimensioned to telescopically receive dispensing head 1 with refill cartridges 101 and 102 loaded therein. Specifically, upper shroud 3 is arranged to closely conform in sliding relation with lower shroud 9. The upper and lower shrouds 3 and 9 include means for guiding linear motion between the dispensing head 1 and reusable base 2, shown as conforming longitudinal projecting ridges 51 and 52. These ridges are longitudinal, outward, rectangular extensions of the shrouds 3 and 9 having parallel side walls and flat facing surfaces. The projecting ridge 52 of the lower shroud 9, which forms an inner groove 55, is dimensioned to receive longitudinal ridge 51 of the upper shroud 3. When the two shrouds are assembled and compressed the longitudinal ridges 51 and 52 serve to guide the relative motion of the dispensing head and the reusable base, preventing their relative rocking and providing smooth, equal, linear motion of the piston heads even when the flowable materials have different rheologies.

The shrouds 3 and 9 may be provided with longitudinal projecting ridges on both their front and back sides. The front ridges 51a and 52a as shown in FIG. 1, may have different widths then back ridges 51b (unseen) and 52b. These then serve to orient the reusable base with respect to the dispensing head. This is especially useful when the dispensing head is to be used with a reusable base which has an extension such as extension 57 designed to prevent the forward tipping of the multicavity dispenser when downward pressure is applied to the dispensing head 1.

It is understood that the means for guiding linear motion between the refill cartridge and the reusable base may be of any acceptable shape and comprise a plurality of extensions, both inward and outward. In addition to providing guided relative motion of the shrouds, the extensions improve the mechanical rigidity of the shrouds.

Referring to FIG. 5, when dispensing head 1 and the reusable base 2 are compressed, piston rods 8 simultaneously and equally push upwards the piston heads 4, in inner cylinders 101 and 102, thereby forcing the flowable reactive materials upwards and into the outlet channels 12 and through outlet assembly 5. Flowable materials from each of the outlet channels 12 is received by outlet assembly 5, shown in FIG. 1, which provides for a forward facing dispensing nozzle. Outlet assembly 5 is fitted about outlet channels 12 and converges so as to end in an outlet passage 14. Outlet passage 14 has two passageways 15, each of which connects through one of the outlet channels 12 to one of the upper portions 130 of the two cylinders 6. The outlet passage 14 of outlet assembly 5 is arranged to receive a separate nozzle 16. Outlet assembly 5 and nozzle 16 together comprise the outlet means 17 as shown in FIG. 1.

The outlet channels 12 receive sleeves of the outlet assembly 5 as described in the referenced patents of Pettingil.

While there has been described what is believed to be the preferred embodiment of the present invention, those skilled in the art will recognize that other changes and modifications may be made thereto without departing from the spirit of the invention and it is intended to claim all such changes and modifications as fall within the true scope of the invention.

I claim:

1. A refillable multi-cavity dispenser for the coextrusion of at least two flowable materials comprising:
   a reusable dispensing head comprising at least two hollow and separate parallel outer cylinders, said outer cylinders having a first generally closed end and outlet channels at said closed end;
   a reusable base unit which slidingly and telescopically accommodates said dispensing head, said base unit having piston rods;
   at least two disposable refill cartridges each comprising a hollow inner refill cylinder, each inner cylinder being telescopically and sealingly accommodated within one of said outer dispensing cylinders, each inner refill cylinder for containing one of said flowable materials, each of said inner refill cylinders having a generally open top end for providing fluid communication with one of said outlet channels, said top end of said refill cylinders comprising a flange for providing a seal between said inner refill cylinder and a corresponding one of said outer cylinders, said flange having an outer diameter greater than the diameter of said inner cylinder and providing frictional engagement to said outer cylinder, and a bottom end telescopically and slidingly accommodating a piston head which conforms to ride sealingly along the interior walls of said inner refill cylinder so as to force said flowable materials to flow toward said top end of said inner refill cylinders upon relative compression of said inner refill cylinder and piston head, said piston heads being compressibly engagable with said piston rods of said reusable base unit; and
   an outlet means in fluid communication with said outlet channels, said outlet means including adjacent outlet openings unconnected to each other and having means for causing said flowable material to flow toward each other at said outlet openings to form a single banded, unmixed stream of said materials outside of said outlet means.

2. A refill cartridge for use with a refillable multi-cavity dispenser for the coextrusion of at least two flowable materials, comprising a hollow refill cylinder for being telescopically and sealingly accommodated within parallel outer dispensing cylinders of a reusable dispensing head, said refill cylinder containing one of said flowable materials, said refill cylinder having an open top end said top end of said refill cylinder comprising a flange for providing a seal between said inner refill cylinder and a corresponding one of said outer dispensing cylinders, said flange having an outer diameter greater than the diameter of said inner cylinder and providing frictional engagement to said outer cylinder, and said refill cylinder having a bottom end telescopically and slidingly accommodating a piston head which conforms to ride sealingly along the interior walls of said refill cylinder so as to force said flowable materials to flow toward said top end of said refill cylinder upon relative compression of said refill cylinder and piston head, said piston head being compressibly engagable with a piston rod of a reusable base unit; and means for temporarily sealing said top end of said inner refill cylinders.

3. A refill cartridge as specified in claim 2 wherein said means for sealing said top end comprises a peel off seal adhering to said flange.

* * * * *